3,436,189
SPOT TEST TO DIFFERENTIATE BETWEEN ALLOYS, 90–10 COPPER NICKEL AND 70–30 COPPER NICKEL
David M. Zall, Anne Arundel County, Md., assignor to the United States of America as represented by the Secretary of the Navy
No Drawing. Filed July 20, 1966, Ser. No. 566,715
Int. Cl. G01n 31/22, 31/00
U.S. Cl. 23—230          6 Claims The invention described herein may be manufactured and used by or for the Government of the United States of America for governmental purposes without the payment of any royalties thereon or therefor.

This invention relates to a method of non-destructive chemical identification testing of copper and nickel alloys and more particularly to a spot test for differentiating between Monel, 90–10 copper-nickel (90% Cu, 10% Ni) and 70–30 copper-nickel (70% Cu, 30% Ni) alloys.

In recent years the use of copper and nickel alloys has become widespread in situations where high strength, toughness and corrosion resistance are necessary. (The term "copper and nickel alloys" is used herein as generic to Monel and copper-nickel alloys.) A particularly extensive application for such alloys is environments which are exposed to the corrosion effects of fresh and salt water. Such alloys have been used in pumps, propellers, tanks, pipes, fasteners, studs, bolts and other related equipment.

A particular problem encountered when using materials composed of such alloys is identifying the component alloy. In order to maintain the integrity of a system and insure maximum reliability it is essential that components made of the same alloy composition be used to the fullest extent possible throughout the system. Because such alloys have a similar physical appearance their identification, particularly in the field, has been difficult.

Although chemical tests have been heretofore proposed for identifying particular copper and nickel alloys such tests suffer from several disadvantages. For instance, many tests had to be conducted in a laboratory environment with skilled chemists using elaborate facilities working under scientifically favorable conditions. Furthermore, many tests required complex equipment or reagents which were difficult to handle and/or dangerous to use. In addition, no test was heretofore available which could accurately and reliably distinguish, by means of a characteristic color spot, between Monel and other copper-nickel alloys.

It is therefore an object of this invention to provide a method for identifying alloys comprised of copper and nickel.

It is another object of this invention to provide a simple chemical spot test for identifying Monel (as well as K-Monel), 90–10 copper-nickel or 70–30 copper-nickel.

A further object of this invention is to provide a test for distinguishing between several types of copper and nickel alloys which is reliable, accurate and which can be conducted in the field under adverse conditions and without the need for highly trained personnel.

With these and other objects in view, the present invention contemplates a method including the steps of preparing a solution of ammonium chloride in concentrated ammonia, depositing a small quantity of the solution on a circle of filter paper and then pressing the filter paper against the specimen. After several minutes a blue color will appear on the filter paper if the specimen is copper-nickel alloy. The absence of a color change indicates that the specimen is Monel metal. The filter paper is then removed from the specimen. A black spot on the specimen indicates that the specimen is 90–10 copper-nickel alloy; otherwise it is 70–30 copper-nickel.

A specific example of a method by which the invention may be successfully practiced is as follows: A solution of 10% ammonium chloride in concentrated ammonium hydroxide is prepared. One drop of the solution is deposited on a circle of filter paper. The filter paper is preferably of the fiber glass type having a diameter of 2.4 cm. Next the ammonia solution-wetted filter paper is pressed against a suitable area of the alloy specimen which is to be tested. A rubber stopper or finger stall may be used to insure good contact wtih the metal and avoid contamination from the fingers or hand. The filter paper is allowed to remain in place for approximately two minutes to complete the reaction. At that time a resulting blue color change on the filter paper will indicate the presence of a copper-nickel alloy. If there is no color change within the time period of two minutes, the specimen may be identified as Monel metal. The filter paper is then removed and, where the presence of a copper-nickel alloy had been indicated by a blue spot on the filter paper, the particular copper-nickel alloy may be identified. A resultant black spot on the specimen shows the alloy is 90–10 copper-nickel; while the absence of the black spot indicates 70–30 copper-nickel.

Having described the invention, it will be apparent that many modifications will be apparent to one skilled in the art and, consequently, the scope of the invention is to be measured solely by the following claims.

What is claimed is:

1. A spot test for distinguishing between alloys of copper and nickel by means of color development which comprises the step of:
    contacting the surface of a specimen of a copper and nickel alloy of unknown composition with a solution of ammonium chloride in concentrated ammonium hydroxide for a period of several minutes whereby the resulting color will be blue in the case where said alloy is copper-nickel and colorless in the case where said alloy is Monel.

2. A spot test as set forth in claim 1 wherein:
    said time period is on the order of two minutes.

3. A spot test as set forth in claim 1 wherein said solution is 10% ammonium chloride in concentrated ammonium hydroxide.

4. A spot test as set forth in claim 1 wherein:
    said surface is contacted with said solution of ammonium chloride by means of filter paper applied to said surface.

5. A spot test as set forth in claim 4 wherein:
    said filter paper is removed from said surface after an interval of several minutes whereby a black spot appearing on said contacted surface indicates the presence of 90%–10% copper-nickel alloy and the absence of a spot indicates the presence of 70%–30% copper-nickel alloy.

6. A spot test as set forth in claim 4 wherein: said filter paper is comprised of fiber glass.

References Cited

UNITED STATES PATENTS 2,360,644  10/1944  Brown _____ 23—230
2,452,036  10/1948  Clardy _____ 23—230

OTHER REFERENCES

MacHattie, I. J. W. et al.; Anal. Chem. 9, No. 8, Aug. 15, 1937, pp. 364–366.

Ayres, G. H. et al.; Anal Chem. 11, No. 7, July 15, 1939, pp. 365–367.

MORRIS O. WOLK, Primary Examiner.

R. M. REESE, Assistant Examiner.

U.S. Cl. X.R.

23—253; 252—408